United States Patent [19]

Shapiro et al.

[11] 3,923,364

[45] Dec. 2, 1975

[54] SHIELDED FLEXIBLE CONDUCTOR CABLE AND ASSEMBLY THEREOF

[75] Inventors: Jonas M. Shapiro, Stamford; Maurice Zetena, Darien, both of Conn.

[73] Assignee: Executone, Inc., Long Island City, N.Y.

[22] Filed: Dec. 6, 1973

[21] Appl. No.: 422,465

[52] U.S. Cl. ........ 339/176 MF; 174/36; 174/117 F; 333/84 M

[51] Int. Cl.$^2$ .......................................... H01R 23/04

[58] Field of Search. 174/36, 117 R, 117 F, 117 FF; 333/84 M; 339/176

[56] References Cited

UNITED STATES PATENTS

| | | | |
|---|---|---|---|
| 2,905,539 | 9/1959 | Bowerman | 174/117 PC X |
| 2,963,535 | 12/1960 | Wegener et al. | 174/117 PC |
| 3,239,916 | 3/1966 | Love | 174/117 FF X |
| 3,469,016 | 9/1969 | Shelton | 174/117 FF UX |
| 3,547,718 | 12/1970 | Gordon | 174/117 FF X |
| 3,663,739 | 5/1972 | Chevrier | 174/117 F X |
| 3,703,604 | 11/1972 | Henschen et al. | 174/11 FF X |
| 3,704,164 | 11/1972 | Travis | 174/117 FF X |
| 3,728,661 | 4/1973 | Kassabgi | 174/117 F X |
| 3,818,117 | 6/1974 | Reyner et al. | 174/117 F X |
| 3,818,119 | 6/1974 | Sutherland et al. | 174/117 FF X |

*Primary Examiner*—Arthur T. Grimley
*Attorney, Agent, or Firm*—Burgess, Dinklage & Sprung

[57] ABSTRACT

A shielded, flat, flexible conductor cable includes a first conductor layer which forms a ground shield. The ground shield has an insulating thereover with a series of spaced-apart, individual, longitudinal conductors thereon. The ground shield layer has a portion thereof extending in a longitudinal direction which is free of insulating layer and individual conductors thus making it possible to establish electrical connections with both the individual conductors and the exposed portion of the ground layer from the same side of the conductor cable.

The shielded cable is ideally utilized in an assembly for mechanically establishing electrical connections with a plurality of circuit boards. The assembly includes a frame or base, the shielded cable described above and a plurality of spaced-apart, rigid connectors mounted on the frame and transversely attached to the shielded cable. Each connector establishes a plurality of electrical connections with the individual conductors and the exposed portion of the ground shield layer from the same side of the shielded cable.

19 Claims, 10 Drawing Figures

SHIELDED FLEXIBLE CONDUCTOR CABLE AND ASSEMBLY THEREOF

BACKGROUND

This invention relates to shielded, flat, flexible conductor cable and to an assembly for mechanically establishing electrical connections between such cable and a plurality of circuit boards. More particularly, this invention relates to shielded cable in a backplane assembly for establishing a plurality of electrical connections between the shielded cable and a plurality of multi-contact printed circuit boards, especially in communications systems.

Insulated flat conductor cable and connectors therefor are well-known. A typical connector is described in Olsson Pat. No. 3,696,319 issued Oct. 3, 1972. With such connectors, however, a practice known as "sciving" must observed before connections can be established with insulated flat conductor cable. The sciving operation involves physically removing one or both layers of insulation which surround the longitudinal conductors of the cable, thereby exposing same and making it possible to establish electrical connections.

Typical electrical connectors for connecting printed circuit boards and flexible conductor cables of this type are shown, for example, in Scheneck Pat. No. 3,102,767 issued Sept. 3, 1963; Hasenauer Pat. No. 3,158,421, issued Nov. 24, 1964; and McCullough Pat. No. 3,319,216 issued May 9, 1967. These connectors, however, involve high area, low pressure electrical contacts which, because they are not gas tight, can oxidize and otherwise deteriorate leading to breakdowns and failures.

Previous electrical connectors for printed circuit boards and flexible conductor cables also present problems where a shielded cable must be used, for example, in an interconnect communications systems where electrical connections must be established between not only the individual conductors of the flexible cable but also the ground shield layer.

The present invention provides a unique shielded, flat, flexible conductor cable structure and an assembly thereof for establishing a plurality of electrical connections between the cable and a plurality of parallel printed circuit boards wherein electrical connections are established between both individual conductors and the ground shield layer of the cable from the said side thereof. This assembly is especially suited for use as a backplane assembly in miniturized and computerized solid-state communications systems where the use of a ground or shielded flexible conductor cable is essential for proper operation. The assembly of the invention can thus be characterized as providing a plurality of mechanical, gas tight electrical connections, especially in a pluggable backplane assembly for receiving a plurality of parallel printed circuit boards. Such a backplane assembly can be considered as the equivalent of an array or plurality of coaxial cables.

SUMMARY

The shielded, flat, flexible conductor cable of the invention includes a first conductor layer forming a ground shield having an insulating layer thereover with a series of spaced-apart, individual, longitudinal conductors thereon, said ground layer having an exposed portion extending in the longitudinal direction free of insulating layer and individual conductors.

The assembly of the invention for mechanically establishing electrical connections between the shielded conductor cable and a plurality of circuit boards, especially a backplane assembly for communications systems, includes:

a. A frame or base member;

b. a flat, flexible conductor cable as described previously; and c. a plurality of spaced-apart, rigid connector means mounted on the frame and transversely attached to the conductor cable, each of the connectors establishing a plurality of electrical connections with the individual conductors and the exposed portion of the ground shield layer of the conductor cable, both from the same side of the conductor cable.

In a preferred embodiment, the rigid connectors include an anvil member adapted to contour the shielded flexible cable from the ground shield side thereof and a female member containing a plurality of spaced-apart individual connectors which is adapted to receive the anvil member and the contoured cable. The individual connectors of the female member establish electrical connections with the individual conductors and the exposed portion of the ground shield layer of the flexible conductor cable from the same side thereof.

DESCRIPTION OF THE DRAWING

The present invention will be more fully understood from the following description taken in conjunction with the accompanying drawing wherein.

DESCRIPTION

Figures 3, 4, 5A, 5B, 7:
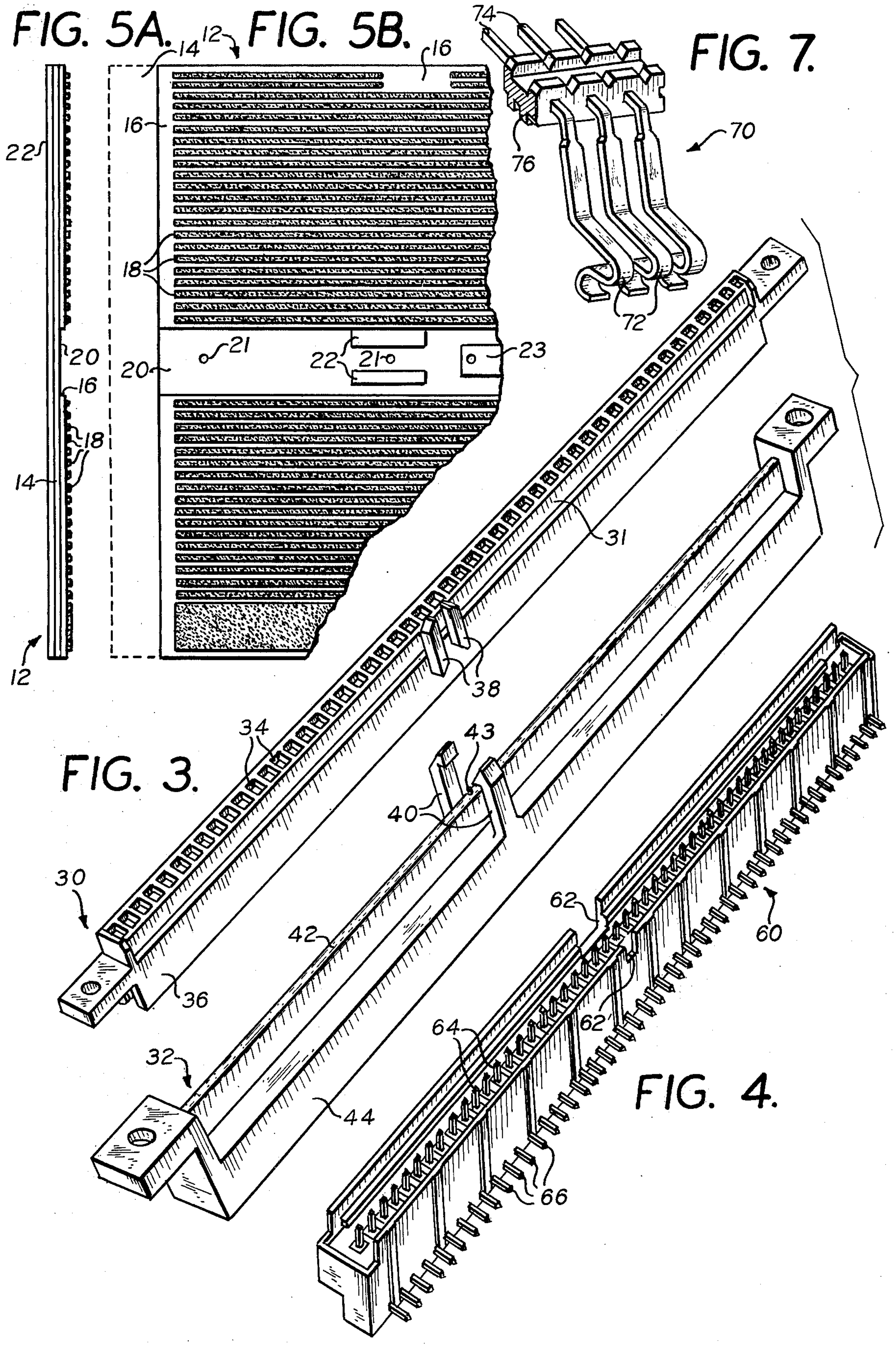
FIG. 3 is an exploded view in perspective of a rigid connector assembly used in the backplane assembly of the invention.
FIG. 4 is a perspective view of a connector member used with the backplane assembly of the invention for mounting and attaching printed circuit boards.
FIG. 5A is a cross-sectional view of flat, flexible conductor cable according to the invention
FIG. 5B is a top plan view, partly broken away, of flat, flexible conductor cable according to the invention.
FIG. 7 is a perspective view showing a signal tab connector that can be incorporated into the assembly of the invention to provide individual, unshielded connector sites.

Referring now to the drawing, and in particular to FIGS. 5A and 5B, the flat, flexible conductor cable 12 of the invention is shown to include a first conductor layer 14 (generally of copper or other suitable conductor metal) which forms a ground shield. An insulating layer 16 is applied to the shield layer 14 and a plurality of spaced-apart, parallel, longitudinal, individual conductors 18 are applied to the insulating layer 16. The ground layer 14 has an exposed pattern 20 thereof which extends in the longitudinal direction and is free of the insulating layer 16 and the individual conductors 18.

In a preferred embodiment, the flexible cable 12 also includes a backing layer 22 of insulation. The insulating layers 16 and 22 can be formed from known insulating materials which includes polymeric and elastomeric materials. A preferred insulating material is a polymeric material sold under the trademark "Mylar".

The shielded cable 12 is also preferably provided with alignment apertures 21 in the exposed portion 20 of the ground shield layer 14 at predetermined, spaced-apart locations for registry with connectors transversly attached to the cable as described in greater detail herein.

The shielded cable 12 can also be provided with predetermined void areas in the exposed portion 20 of the shield layer 14 for programming printed circuit boards electrically connected to the cable. Two such void areas are shown in FIG. 5B to be rectangular in shape exposing portions of the underlying insulating layer 22. A similar programming effect can be obtained by removing selected portions of the individual conductors 18, for example, as shown at the top of FIG. 5B where a portion of the top two conductors 18 is shown removed exposing the underlying insulating layer 16.

Programming or coding using void areas in the exposed portion 20 of the ground layer 14 and/or by removing selected portions of the individual conductors 18 makes it possible to locate and identify printed circuit board positions within a given assembly. In other words, by so designing the cable of the invention, it is possible to electrically address a particular printed circuit board in a given assembly. This is done, as explained previously, by selectively removing areas of the exposed portion 20 of the ground layer 14 to bare the underlying insulating layer 22 and/or by removing selected portions of the individual conductors 18 to bare the underlying insulating layer 16. In this manner, individual connectors of the rigid connectors (described in greater detail herein) do not make electrical contact at pre-selected and predetermined sites. Thus, by controlling the location and frequency of these sites within the cable 12 each printed circuit board in the assembly can be programmed in a desired manner.

FIG. 5B shows a further alternate embodiment wherein the ground shield layer 14 extends a predetermined distance beyond one or both ends of the cable 12. This is shown in FIG. 5B by the dotted lines extending beyond the left end of the cable construction. By extending the ground layer 14 beyond the end of the cable 12, a transverse contact area is provided across the entire width of the cable. This makes it possible to establish an ultra-low impedance ground return or power feed contact.

The cable 12 is also preferably provided with cut-out tabs 23 in the exposed portion 20 of the ground shield layer 14 which are adapted to be attached to an electrical conductor forming low impedance, high current connections as described in greater detail herein.

Figures 1, 2, 6A, 6B, 8:
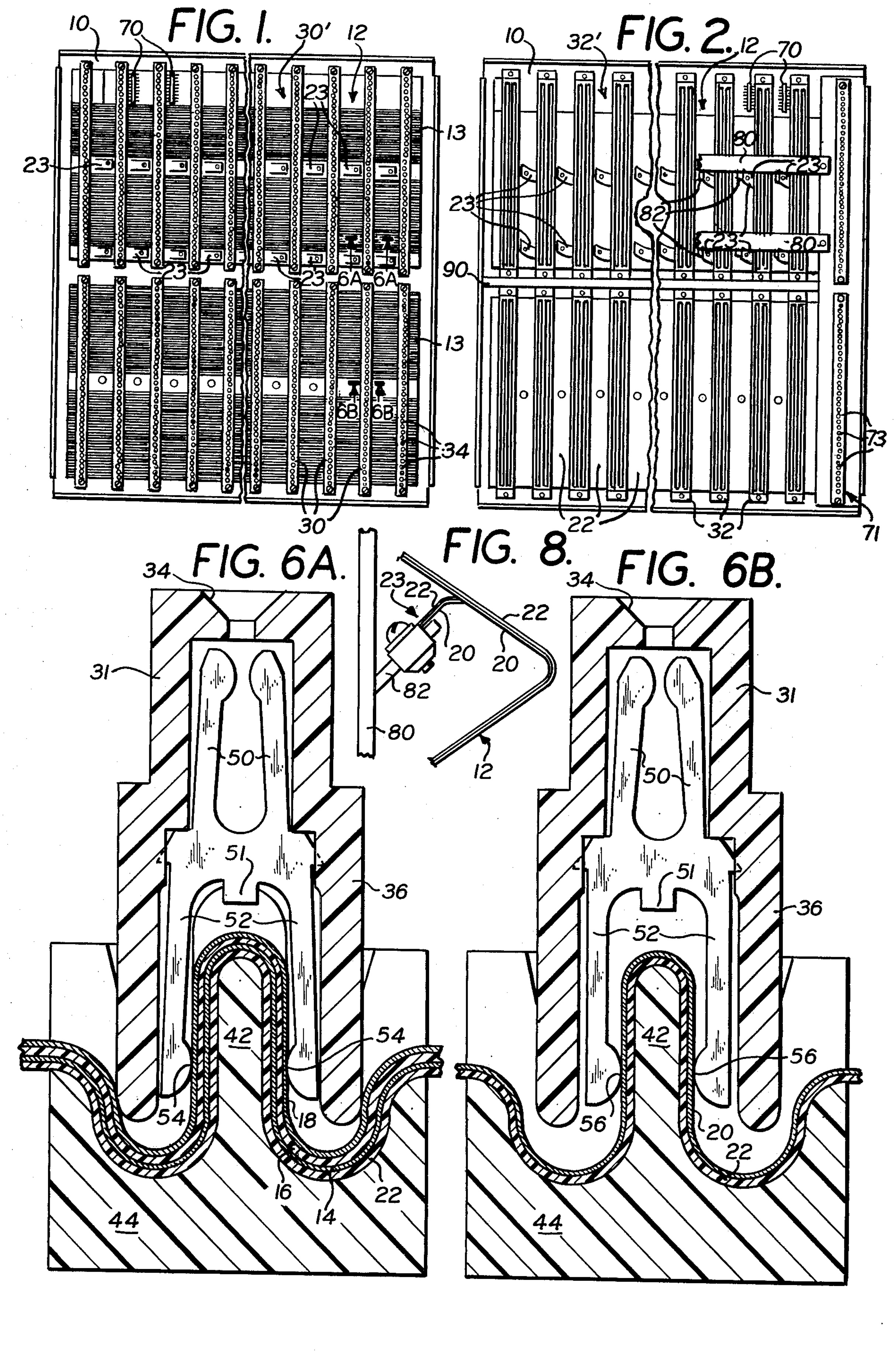
FIG. 1 is a front plan view, partly broken away, of the backplane assembly of the invention.
FIG. 2 is a back plan view, partly broken away, of the backplane assembly as shown in FIG. 1.
FIG. 6A is a sectional view taken along line 6A—6A of FIG. 1.
FIG. 6B is a cross-sectional view taken along line 6B—6B of FIG. 1.
FIG. 8 is an enlarged side view in elevation of a portion of the assembly shown in FIG. 2.

FIGS. 1 and 2 show a preferred backplane assembly incorporating the shielded conductor cable of the invention. The backplane assembly of the invention is shown to include a base or frame member 10, the flat, flexible conductor cable 12 and a plurality of spaced-apart rigid connectors 30, 32 mounted on the frame 10 and transversely attached to the conductor cable 12.

The rigid connectors 30, 32 are shown in FIG. 3 to include an anvil member 32 and a female member 30. The ends of each of the members 30 and 32 are provided with apertured terminal portions which are adapted to align with one another for mounting on the frame member 10 as shown in FIGS. 1 and 2 via corresponding holes in the frame member 10 utilizing conventional fastening members such as nut and bolt assemblies, screws or snap connectors.

The anvil member 32 includes a base 44, an anvil 42, and in preferred embodiments a centrally positioned protruding portion 43 and one or more guide arms 40. The protruding portion 43 on the anvil 42 is adapted to register with the alignment apertures 21 of the conductor cable 12 as shown in FIG. 5B. This makes is possible to connect the rigid connector assembly 30, 32 at predetermined transverse locations on the cable 12.

The female member 30 includes an upper housing 31 forming a row or orifices 34 which are adapted to receive terminal connectors. Upper housing 31 is integral with a lower housing 36 and the female member 30 is provided with guide members 38 on one or both sides thereof which are adapted to receive and guide arms 40 of the anvil member 32 to insure proper alignment therebetween.

The manner in which the rigid connectors 30, 32 establish electrical connections with the individual conductors 18 and the exposed portion 20 of the ground shield layer of cable from the same side thereof is illustrated in FIGS. 6A and 6B. FIG. 6A shows one of the individual connectors of the female member 30 which are spaced-apart at right angles to the longitudinal axis of member 30 and positioned adjacent each of the orifices 34 in the upper housing 31. Each individual connector includes an upper portion with biased arms 50 and a lower portion with biased arms 52. The upper arms 50 are contained in the upper housing 31 whereas the lower arms 52 are contained in the lower housing 36 of the female member 30.

The anvil 42 of the anvil member 32 contours the flexible cable 12 from the ground shield side thereof as illustrated in FIG. 6A. The individual connectors of the female member 32 that are aligned with portions of the conductor cable 12 having individual conductors thereon establish electrical connection with the individual conductors 18 at points 54 as shown. FIG. 6B shows the manner in which the arms 52 of the lower portion of the individual connectors positioned and spaced apart in the female member 30 establish electrical connections with the exposed portion 20 of the ground shield layer 14 at points 56.

The individual connectors are shown in FIGS. 6A and 6B to include member 51 which serves as a locking tab or key which is deflected into frictional engagement with the body of the female member 2.

If desired, at one or both ends of the assembly of the invention, the flexible cable 12 can be folded back on itself at 13 as shown in FIG. 1 and attached to a rigid connector 71 mounted on the opposite side of the frame 10 adjacent one or both ends thereof as shown in FIG. 2. The rear side connector 71 is shown to have a series of orifices 73 which are the same as the orifices 34 of the female member 30. The rigid connector 71 is assembled from an anvil member and female member similar to those shown in FIG. 3.

It is also possible to utilize a flexible cable of the invention as shown in FIG. 5B having an extended ground shield layer 14 in the assembly shown in FIGS. 1 and 2 in which case a front side and/or back side rigid connector adjacent one or both ends of the assembly would be transversely attached to the extended portion of the ground shield layer 14.

A portion of the connectors 30, 32 for example as indicated by the reference numerals 30′ and 32′ in FIGS. 1 and 2, can be adapted to establish electrical connections with another type of connector device, for example the signal tab connector 70 shown in FIG. 7 and shown installed between connector members 30 and 32 in FIGS. 1 and 2. Such a signal tab 70 includes a terminal 74, a body member 76 and contoured connector member 72 which are adapted to fit over the anvil 42 of the anvil member 32 for establishing electrical connections substantially as shown in FIG. 6B. The use of the portion of the assembly as shown in FIGS. 1 and 2 for other devices such as the signal tab connector 70 makes it possible to provide for unshielded individual connections lending greater flexibility to the assembly itself.

Another unique capability of the assembly of the invention involves use of the cut-out tabs 23 of the flexible conductor cable 12. As shown in FIGS. 1 and 2 the cut out tabs 23 are positioned between the rigid connectors 30, 32 in a line for attachment to the longitudinal bus bar 80 mounted across the back of the frame 12 in the longitudinal direction relative to the cable 12. Two such rows of tabs 23 are shown each of which is attached to a bus bar 80 as illustrated in FIG. 2. The manner for connecting tabs 23 to the bus bar 80 is illustrated in FIG. 8. Here the cable 12 is shown with a bulge between adjacent connectors 30, 32 which makes it easier to deflect tab 23 for connection with the cut-out bent-in tab 82 of the bus bar 80. In this way, the exposed portion 20 of the ground shield layer 14 makes electrical contact with the tab 82 of the bus bar 80 while the upper layer of insulation 22 contacts the screw connecting assembly. The connections shown in FIG. 8 form low impedance, high current electrical connections.

It should be noted that the exposed portion 20 of the ground shield layer can be designed to be in a central area of the cable 12 as shown in FIG. 5B and two or more such exposed portions 20 can be utilized as shown in the upper portion of the assembly of FIG. 1 wherein the cable 12 has central and marginal exposed portions 23 each with cut-out tabs 23 connected to bus bars 80 attached across the back of the frame member and to the tabs 23. The bus bars can be utilized as shown in FIG. 2 to feed current in to the assembly through printed circuit board plugged into the front side of the assembly and out through the other bus bar attached to the same cable 12. If desired the exit or ground bus bar can be attached to a separate adjacent cable 12 as shown in FIG. 2. It should be noted that the longitudinal connectors represented by bus bars 80 can be used in conjunction with or replaced by a cable 12 having an extended terminal ground shield layer as shown in FIG. 5B and described previously.

FIGS. 6A and 6B illustrate how the assembly incorporating flexible cable 12 of the invention makes it possible to establish electrical connections with the individual conductors 18 on the flexible cable 12 and at the same time and on the same side of the flexible cable 12 to establish electrical connections with the exposed portion 20 of the ground shield layer 14. As described in connection with the signal tab connector 70 it is also possible to make unshielded individual connection within the same assembly.

To insure proper alignment when contouring the flexible cable 12 and assembling rigid connectors 30, 32 for mounting on frame member 10, means are provided to align the cable 12 with the connectors 30, 32. The cable 12 is aligned relative to the rigid connector via projection 43 on anvil 42 and alignment aperture 21 in the exposed portion 20 of the ground shield layer 14 of cable 12 as described previously and the members 30, 32 of the rigid connectors are aligned relative to each other via arms 40 and guide member 38 as shown in FIG. 3. In the embodiment shown, the guide member 38 are provided on one side of the member 30. One of the two guide arms 40 of member 32 is guided between guide members 38 for proper alignment. The guide arms 40 also have upper projecting portions which are adapted to snap over the upper surface of the housing 31 to maintain a proper and secure fit between member 30 and 32 of the rigid connector assembly. This connector assembly is used for transverse attachement to the flexible cable 12 and mounting within the frame member 10. FIG. 1 shows the front side of the preferred backplane assembly with orifices 34 ready to receive parallel printed circuit boards plugged into the assembly at right angles thereto. FIG. 2 shows the back side of the assembly and the underside of the anvil member 32 plus the reverse side of connector 71 which can be adapted for mounting a termination printed circuit board or an additional input or output at the rear or reverse side of the assembly.

In FIG. 4, there is shown a dual connecting member 60 which can be mounted on a printed circuit board. The terminals 66 are utilized to establish electrical connections with suitable connectors on the printed circuit board itself while the row of terminals 64 are adapted to be inserted or plugged into the row of orifices 34 as shown in the assembly of FIG. 1 to establish electrical connections with the upper biased arms 50 of the individual connectors of the female member 30 as shown in FIG. 6A and 6B and described previously.

The connector or header member 60 is also preferably provided with centrally located cut-out portions 62 and 62′. Cut-out portions 62 is adapted to receive that portion of an assembled connector corresponding to a guide arm 40 in place between guide members 38 while the cut-out portion 62 is adapted to receive the opposite guide arm 40. This insures for proper alignment and connection between individual printed circuit boards and the parallel rigid connectors 30, 32 in the assembly of the invention.

FIG. 2 shows the use of a preferred stiffening means which in this embodiment is a centrally located bar member 90 which is adapted to prevent flexing of the frame member 10 when plugging in printed circuit boards. A bar member 90 as shown in FIG. 2 can be used and/or other stiffening members such as angle bars at the edges of the assembly can be used if desired.

The shielded flexible conductor cable of the invention offers many advantages. For example, the cable of the invention makes it possible to provide a plurality of shielded connections equivalent to an array or plurality of coaxial cables, but at a cost significantly lower than coaxial cables. The power can be fed in and out to an assembly incorporating the shielded cable via low impedance, high current connections. It is also possible to program a printed circuit board assembly via the flexible cable as described herein. The extended ground shield layer also gives the ability to form an ultra low impedance ground return or power feed.

As for the assembly of the invention and the preferred backplane assembly, there are numerous advantages. For instance, in the same assembly it is possible to have plurality of grounded "T" connections as well as unshielded individual connections. The use of tabs 23 and bus bars 80 and/or extended terminal portions of the ground shield layer makes it possible to distribute power input without, however, any undesirable heat build up.

The preferred backplane assembly of the invention can be considered as a series of rigid connection sites on a transmission line at right angles thereto making it possible to establish, through pressure along, without solder, mechanical, gas tight electrical contacts with the individual conductors 18 of the flexible conductor cable 12. The assembly of the invention and especially the shielded backplane assembly of the invention can thus be utilized as a transmission line in telephone communications systems, computers and the like.

What is claimed is:

1. Flat, flexible conductor cable comprising a first conductor layer forming a ground shield having an insulating layer on one side thereof with a series of spaced-apart, individual, longitudinal conductors on the insulating layer, said one side of the layer having an exposed portion extending in the longitudinal direction between the individual conductors which is free of said insulating layer and said individual conductors.

2. Cable of claim 1 wherein the other side of the ground shield layer has a layer of insulating material applied thereto.

3. Cable of claim 1 wherein said exposed portion of the ground shield layer has apertures therein at predetermined locations for registry with connector means transversely attached to said cable.

4. Cable of claim 1 wherein said exposed portion of the ground shield layer has predetermined void areas for programming printed circuit boards electrically connected to said cable.

5. Cable of claim 1 wherein selected portions of said individual, longitudinal conductors are removed for programming printed circuit boards electrically connected to said cable.

6. Cable of claim 2 wherein said exposed portion of the ground shield layer has cut-out tabs adapted to be attached to an electrical conductor forming low impedance, high current connections.

7. Cable of claim 1 wherein the ground shield layer extends a predetermined distance beyond one or both ends of said cable.

8. Assembly for mechanically establishing electrical connections between a flat flexible conductor cable and a plurality of circuit boards comprising a. frame means;

b. flat, flexible conductor cable means including a first conductor layer forming a ground shield having an insulating layer on one side thereof with a series of spaced-apart individual, longitudinal conductors on the insulatng layer, said one side of the ground layer having an exposed portion extending in the longitudinal direction between the individual conductors which is free of said insulating layer and said individual conductors; and c. a plurality of spaced-apart, rigid connector means mounted on said frame means and transversely attached to said conductor cable, each of said connector means establishing a plurality of electrical connections with the individual conductors, and the exposed portion of the ground shield layer of said conductor cable means, both form the same side thereof.

9. Assembly of claim 8 wherein said rigid connector means include an anvil member adapted to contour said flexible conductor cable means from the ground shield side thereof and a female member containing a plurality of spaced-apart individual connectors adapted to receive the anvil member and contoured cable, said individual connectors establishing electrical connections with the individual conductors and the exposed portion of the ground shield layer of said conductor cable from the same side thereof.

10. Assembly of claim 8 wherein the other side of the ground shield layer of said cable has a layer of insulating material applied thereto.

11. Assembly of claim 10 wherein said exposed portion of the ground shield layer of said cable has cut-out tabs positioned between said rigid conductor means, and said assembly includes longitudinal connector means adapted to be attached to said tabs forming low impedance, high current electrical connections.

12. Assembly of claim 8 wherein said cable means and said rigid connector means are each provided with alignment means for attaching said rigid connector means to said cable at predetermined locations.

13. Assembly of claim 9 wherein said exposed portion of the ground shield layer of said cable has alignment apertures therein at predetermined locations and said anvil member has a protruding portion adapted to register with said alignment apertures.

14. Assembly of claim 9 wherein said anvil is provided with at least one guide arm and said female member is provided with at least one corresponding guide member for registry with said guide arm.

15. Assembly of claim 8 wherein said frame means includes stiffening means to prevent flexing of said frame means when circuit boards are plugged into said assembly.

16. Assembly of claim 8 wherein said exposed portion of the ground shield layer of said cable has predetermined void areas for programming circuit boards electrically connected to said cable via said rigid connector means.

17. Assembly of claim 8 wherein selected portions of said individual, longitudinal conductors of said cable are removed for programming circuit boards electrically connected to said cable via said rigid connector means.

18. Assembly of claim 8 wherein the ground shield layer of said cable extends a predetermined distance beyond one or both ends of said cable and one or more of said rigid connector means are mounted on said frame means and transversely attached to said extended ground shield layer.

19. Assembly of claim 8 wherein one or both ends of said cable means are folded back and attached to one of said rigid connector means mounted on the opposite side of said frame means.

* * * * *